July 1, 1952  H. J. EISENHAUER  2,601,882
COLLAPSIBLE ANTISKID DEVICE
Filed Feb. 17, 1949  4 Sheets-Sheet 1

INVENTOR.
Harry J. Eisenhauer
BY Bean, Brooks, Buckley & Bean
ATTORNEYS.

July 1, 1952  H. J. EISENHAUER  2,601,882
COLLAPSIBLE ANTISKID DEVICE
Filed Feb. 17, 1949  4 Sheets-Sheet 2

INVENTOR.
Harry J. Eisenhauer
BY Bean, Brooks, Buckley & Bean
ATTORNEYS.

July 1, 1952 H. J. EISENHAUER 2,601,882
COLLAPSIBLE ANTISKID DEVICE
Filed Feb. 17, 1949 4 Sheets-Sheet 3

INVENTOR.
Harry J. Eisenhauer
BY Bean, Brooks, Buckley & Bean.
ATTORNEYS.

July 1, 1952  H. J. EISENHAUER  2,601,882
COLLAPSIBLE ANTISKID DEVICE
Filed Feb. 17, 1949  4 Sheets-Sheet 4

INVENTOR.
Harry J. Eisenhauer
BY Bean, Brooks, Buckley & Bean
ATTORNEYS.

Patented July 1, 1952

2,601,882

UNITED STATES PATENT OFFICE 2,601,882

COLLAPSIBLE ANTISKID DEVICE

Harry J. Eisenhauer, Buffalo, N. Y.

Application February 17, 1949, Serial No. 76,896

7 Claims. (Cl. 152—225)

1

My invention relates in general to anti-skid devices for application to automobile tires, and in particular to an anti-skid device of this nature which is made up of a number of separable parts.

The principal object of my invention is to provide an anti-skid device which may be easily and quickly applied to an automobile tire.

Another object is to provide an anti-skid device which is constructed of a number of separable parts for convenient attachment to a tire and for compact storage of the device when not in use.

A further object is to provide a device of this nature which may be quickly assembled and mounted upon a tire without the necessity of jacking up the wheel bearing the same.

Moreover, it is an object to provide tread members which are adapted to extend over the periphery of the tire and to be secured to the gripping members of the device.

Furthermore, my device is inexpensive to manufacture, and it is so designed as to be durable in operation, having its anti-skid feature of such nature that it remains efficient over a long period of use.

The above objects and advantages have been accomplished by the device shown in the accompanying drawing, of which:

Figure 1:
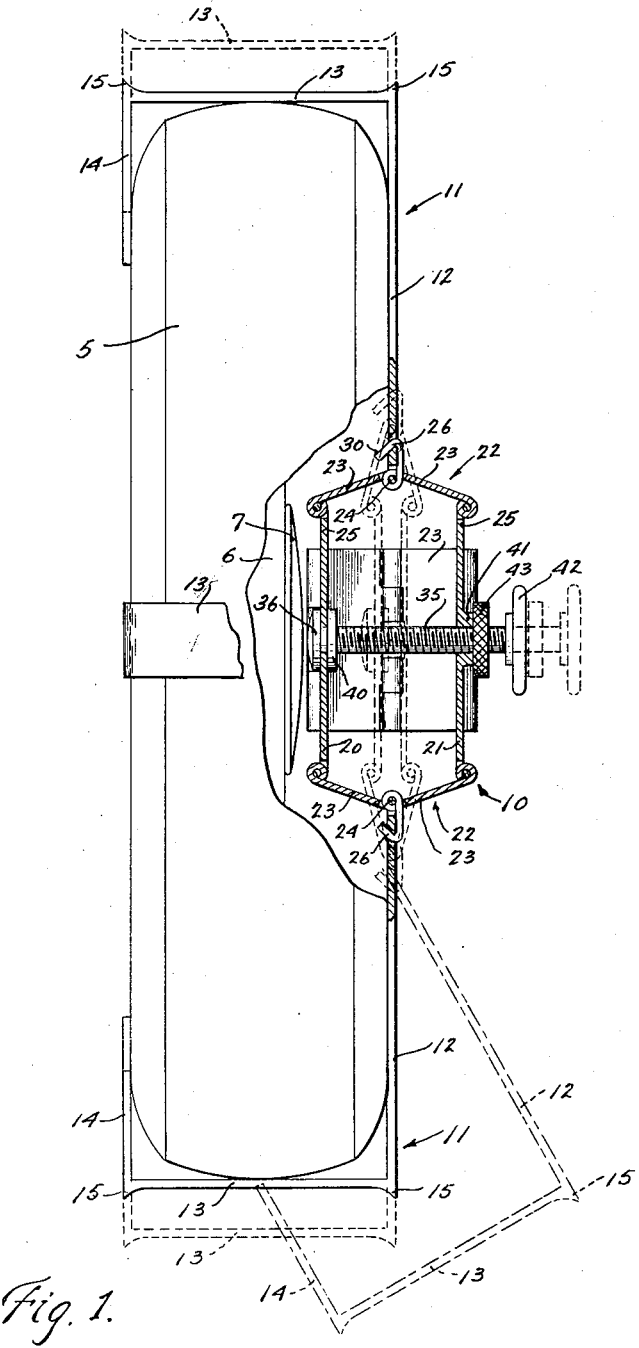
Fig. 1 is a side elevation of my anti-skid device applied to an automobile tire.

In the drawings, 5 represents the tire of an automobile, a portion thereof being broken away

2 to show the wheel structure 6 with its hub cap 7.

My device, as illustrated in Figs 1-4, comprises a clamp member 10 and a plurality of gripping members 11. Each of the gripping members comprises a radially arranged clamp arm 12 which extends across the outer face of the tire and which is attached to the clamp member in a manner to be hereinafter described. Each gripping member is formed with a road-engaging portion 13 at the outer end of each of its clamp arms, and also with a retaining arm 14 which extends downwardly from the inner end of each of the road-engaging portions for contact with the inner face of the tire. Each road-engaging portion is preferably formed at each of its ends with an anti-skid prong 15 for non-slipping engagement with icy pavement.

Figure 2:
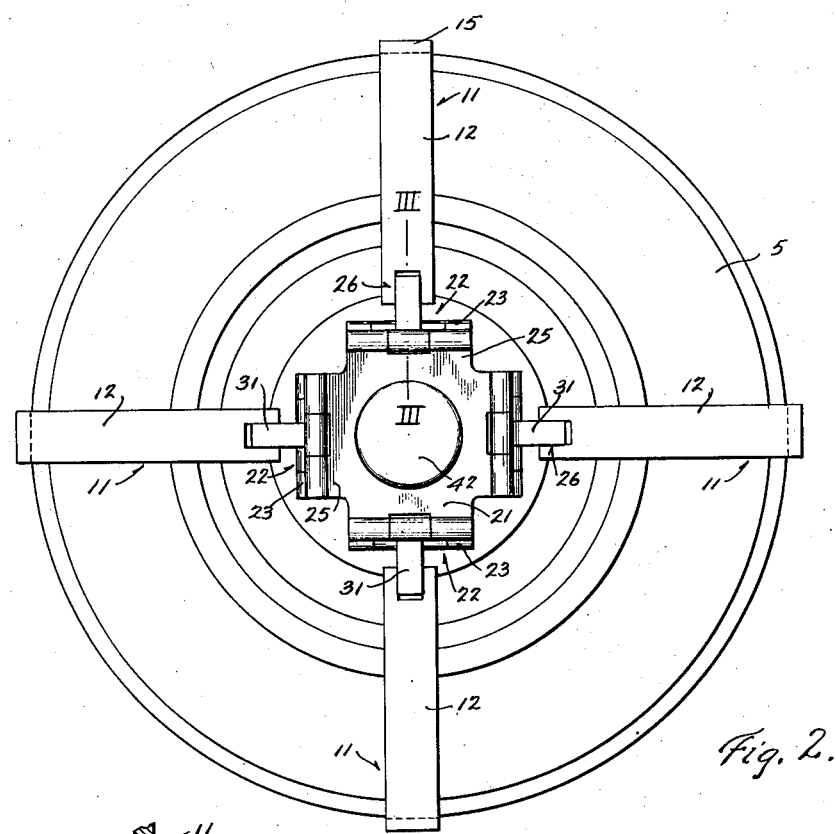
Fig. 2 is a face view thereof on a reduced scale.
Figure 3:
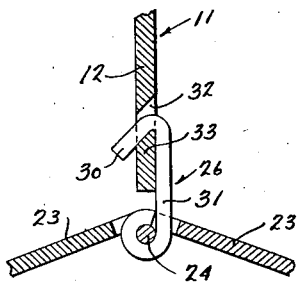
Fig. 3 is an enlarged fragmentary sectional view taken on line III—III of Fig. 2.

The clamp member 10 comprises an inner clamp plate 20 and an outer clamp plate 21 held in adjustable spaced relation by means of toggle joints 22, each comprising two hinge members 23. Each toggle joint has the outer ends of its hinge members pivotally united to the plates 20 and 21 and the adjacent inner ends pivotally united by means of a hinge pin 24. The clamp plates may be circular in form or may be shaped as shown in Fig. 2. For convenience, four arms 25 are formed upon the plate for pivotally receiving four toggle joints, but obviously, the number of arms and joints may be changed to suit specific conditions.

Figure 4:
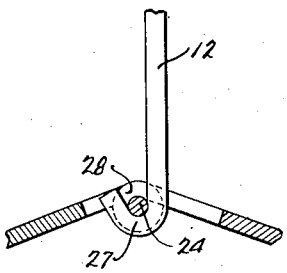
Fig. 4 is a similar sectional view of a modified means of fastening the gripping members to the clamp members.
Figure 6:
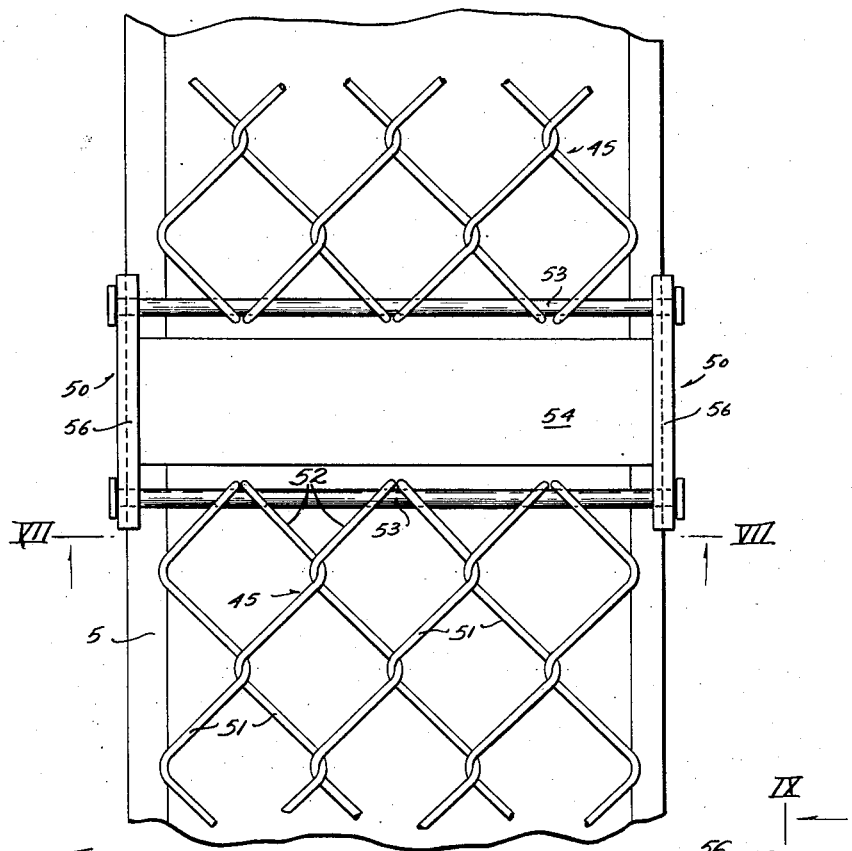
Fig. 6 is an enlarged fragmentary peripheral view of a tire showing the tread members of Fig. 5 in position thereon.
Figure 7:
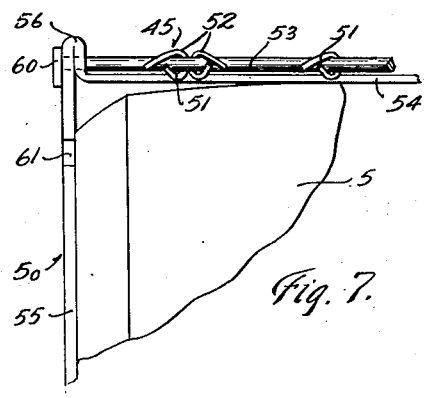
Fig. 7 is a fragmentary sectional view taken on line VII—VII of Fig. 6.

Also mounted upon each hinge pin 24 in a space provided between the engaged hinge members 23 of each toggle joint is a hook 26. This hook has an outer end 30 bent at an angle to the body part 31 which is preferably less than 90° so as to securely engage the aperture 32 formed in the inner end of each of the gripping members 11. Each aperture is preferably inclined so that the portion 33 of the arm lying between the body 31 and lug 30 will securely hold the hook against detachment from the gripping member at all times except when the device is to be removed from the tire. In Fig. 4 I show a modified form of attachment of the gripping members to the clamping members. As here shown, each of the clamp arms 12 is formed at its inner end with a hook 27 which is disposed within a recess 28 formed in the hinge member and which engages that portion of the hinge pin 24 which passes through the recess.

Extending axially between the inner and outer clamp plates 20 and 21, respectively, is a clamp screw 35. This screw is formed at its inner end with two spaced fixed collars 36 and 40, arranged one on each side of the inner plate 20, so that the screw is prevented from relative axial movement with the plate, and whereby this plate may be pushed away from and pulled toward the outer plate 21 by and with the movement of the screw 35. The screw is passed through an interiorly screw-threaded hub 41 formed preferably on the outer face of the clamp plate 21, and a hand wheel 42 is secured to the outer end of the screw whereby it may be rotated. A lock member 43 is mounted upon the screw so that the position of the screw may be locked by forcing the member 43 against the hub 41.

Referring now to Figs. 5 to 8 inclusive, I show tread members 45 designed to be stretched across the tread of the tire between the gripping members 50. Each of these tread members is preferably made from a number of wires 51 of zigzag contour interlaced to form a flexible member extensible across the width of the tire periphery. Each of these members is provided at each end with loops 52 through which a retaining rod 53 is passed. The gripping members 50 are each formed with a tire-engaging portion 54 which extends inwardly from the clamp arm 55 and preferably at right angles thereto. The metal at the junction of each clamp arm and tire-engaging portion is increased in width and these portions are united by means of a return bend portion 56 which extends above the tire-engaging portion 54 and through which the retaining rods pass. Each rod is formed with a head 60 at each end which is disposed on the outside surface of the portions 56 of gripping members to thereby prevent endwise movement of the rods and to maintain the tread members in place upon the tire. Each of the gripping members is provided in it supper end with oppositely arranged V-shaped slots 61 extending first inwardly and upwardly and then outwardly and upwardly terminating in the return bend portion 56. The lower end of each of these slots is open at its inner end for the reception of one of the rods 53 when assembling the tread members to the gripping members. Owing to the formation and position of the slots, the rods and the attached tread members will be kept in position by tension placed upon the tread members.

Figure 10:
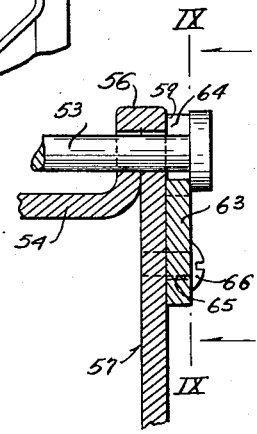
Figure 5:
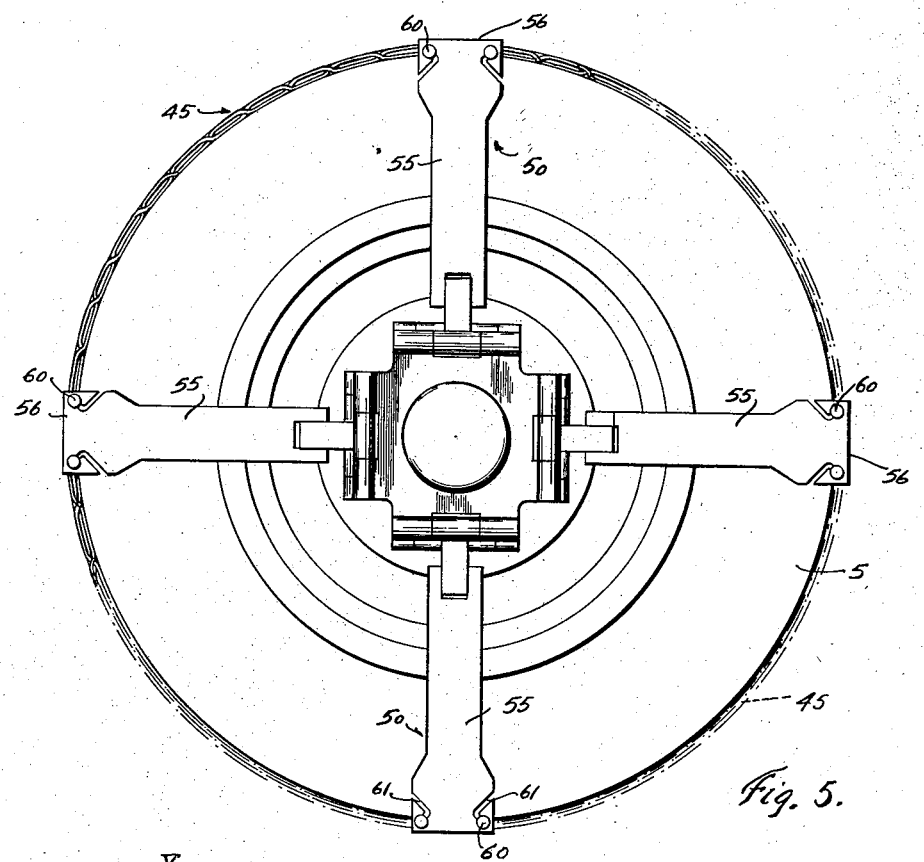
Fig. 5 is a face view of a modified form of device showing the use of tread members.
Figure 9:
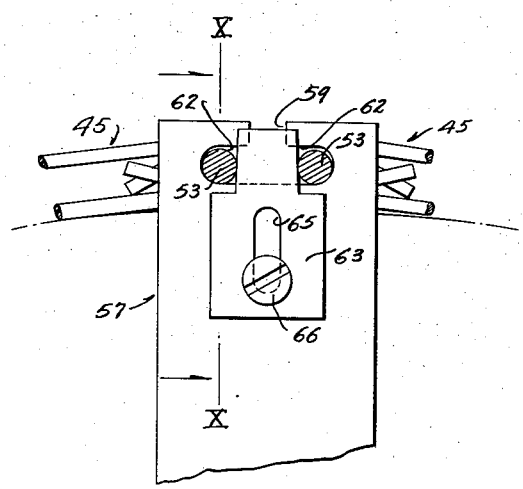
Fig. 9 is a greatly enlarged fragmentary sectional end view of a modified form of fastening means for the tread members, and is taken on line IX—IX of Fig. 10; and, Fig. 10 is a fragmentary sectional view of the form of fastening means of Fig. 9 and is taken on line X—X thereof.
Figure 8:
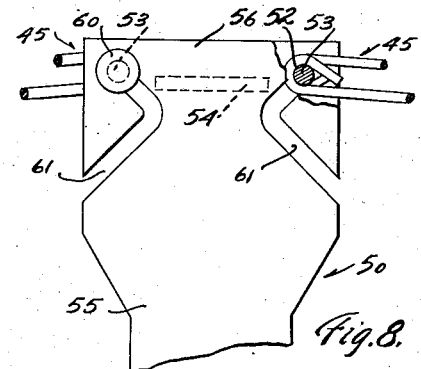
Fig. 8 is a fragmentary end view of one of the clamping members of the device shown in Figs. 5 to 7.

In Figs. 9 and 10 I show a modified form of means of attaching the tread member to the gripping members 57. In this form a radial slot 59 is formed in each of the return bend portions 56 of the gripping members 57 which slot is in communication with two lateral slots 62 each of which extends from the slot 59 in opposite directions. When assembling, each of the rods is separately passed through the radial slot 59 and then engaged with one of the lateral slots 62. After the rods are disposed within their respective lateral slots, a lock plate 63 having a slightly tapered portion 64 is forced upwardly between the opposite rods, thereby forcing them and firmly holding them within their respective slot. The lock plate is formed with a slot 65 for the reception of a lock screw 66 which is attached to the arm of the gripping member 57. While I have shown, in Fig. 5, the use of four tread members, it is obvious that a lesser number may be used if desired. When less than four members are used, it is preferable to arrange one on each of two opposite sides of the tire. However, in an emergency, only one tread member can be used.

When my device is to be assembled upon a tire, two or three of the gripping members 11 are engaged with the upper portion of the tire and moved from the dotted line position shown in Fig. 1 to the full line position. The clamp member 10 which has been previously collapsed by drawing the plates 20 and 21 toward each other, has the lugs 30 of the hooks 26 engaged with the apertures 32 formed in clamp arms of the gripping members. The clamp member will thereby be temporarily supported, and while being so supported, the last one or two gripping members may be engaged with their respective hooks in the position shown by the dot and dash lines shown in Fig. 1, after which these last mentioned gripping members may be moved to the lower dotted line positions. After such initial assembling of the parts to the tire, the clamp screw 35 will be rotated so as to force the clamp plates 20 and 21 apart and to move them with the coacting hinge members from the dotted line positions in Fig. 1 to the full line positions there shown. Obviously, by such movement the hooks will be drawn inwardly toward the axis of the wheel, thereby moving the gripping members from the dotted line positions of Fig. 1 to the full line positions thereof where the road-engaging portions 13 of the gripping members will be drawn into firm contact with the periphery of the wheel. Obviously, to remove the device from the tire, it is only necessary to reverse the screw and draw the plates toward each other thereby forcing the hooks outwardly to release the gripping members and permit them to be removed from the tire. When the tread members 45 are to be used, the device shown in Figs. 5 to 8 is assembled in a manner similar to that just above described and then the tread members are assembled at the most convenient time and either before or after the clamp member has tightened the gripping members upon the tire.

Obviously, some modifications of the details herein shown and described may be made without departing from the spirit of my invention or the scope of the appended claims; and I do not therefore wish to be limited to the exact embodiment herein shown and described.

What is claimed is:

1. An anti-skid device comprising a unit clamp member, said clamp member comprising two oppositely spaced plates, toggle joints for hingedly uniting said plates as a unit independently of said gripping members, a plurality of separate gripping members for engagement with the periphery of the tire, and hook means carried by said clamp member for detachably connecting said gripping members to said clamp member.

2. An anti-skid device comprising a plurality of separate gripping members for engagement with the periphery of a tire, each member having a clamp arm formed with a hook-engaging aperture at its inner end, and a road-engaging portion carried by said clamp arm and provided with means for engaging the tire, a separate clamp member for connection to said gripping members, said clamp member comprising two oppositely spaced plates, toggle joints for hingedly uniting said plates, a clamp screw for moving said plates toward and from each other, and hook means carried by said clamp member for engaging the apertures of said clamp arms.

3. An anti-skid device comprising a plurality of separate gripping members for engagement with the periphery of a tire, each member having a clamp arm formed with a hook-engaging aperture at its inner end, a road-engaging portion carried by said clamp arm, and a retaining arm extending inwardly from the inner end of said road-engaging portion for engagement with the back side of the tire, a separate clamp member for attachment to said gripping members, said clamp member comprising two oppositely spaced plates, a plurality of hinges connecting said plates at spaced intervals, a hook pivotally attached to the hinge pin of each hinge, said hook being formed with a hook lug for engagement with the aperture of each coacting clamp arm, and a clamp screw for moving said plates toward and from each other.

4. An anti-skid device comprising a unit clamp member, a plurality of separate gripping members for engagement with the periphery of an automobile tire, hook means carried by said clamp member for detachably connecting said gripping members to said clamp member, a plurality of tread members disposed upon the periphery of the tire, each of said tread members extending between two adjacent gripping members, and means carried by said gripping members and said tread members for detachably connecting said tread members to said gripping members.

5. An anti-skid device comprising a plurality of separate gripping members for engagement with the periphery of an automobile tire, each member having a clamping arm, and a road engaging portion carried by said clamp arm and engageable with the periphery of the tire, each of said clamp arms being formed with an upstanding portion rising above said tire engaging portion, a separate unit clamp member for drawing said gripping members into non-slipping engagement with the periphery of the tire, detachable means for connecting said gripping members to said clamp member, a plurality of tread members for attachment to said gripping members, and a retaining rod at each end of each of said tread members, the upstanding portion of each gripping member being formed with slots for the locking reception of said retaining rods.

6. An anti-skid device comprising a plurality of separate gripping members for engagement with the periphery of an automobile tire, each member having a clamping arm, and a road engaging portion carried by said clamp arm and engageable with the periphery of the tire, each of said clamp arms being formed with an upstanding portion rising above said tire engaging portion, a separate unit clamp member for drawing said gripping members into non-slipping engagement with the periphery of the tire, detachable means for connecting said gripping members to said clamp member, a plurality of tread members formed of interlaced wire for attachment to said gripping members, and a retaining rod connected to the ends of said wires at each end of each of said tread members, the upstanding portion of each gripping member being formed with slots for the locking reception of said retaining rods.

7. An anti-skid device comprising a separate clamp member, a plurality of separate gripping members for engagement with the periphery of a tire, said clamp member comprising two oppositely spaced plates, toggle joints for hingedly uniting said plates, means for moving said plates toward and away from each other, and means carried by said plates and said gripping members for detachably connecting said gripping members to said clamp member.

HARRY J. EISENHAUER.

REFERENCES CITED

The following references are of record in the file of this patent:

UNITED STATES PATENTS

| Number | Name | Date |
|---|---|---|
| 1,650,437 | Forwood | Nov. 22, 1927 |
| 1,882,376 | Weber | Oct. 11, 1932 |
| 2,429,738 | Zimmer | Oct. 28, 1947 |
| 2,456,544 | Varner | Dec. 14, 1948 |
| 2,477,051 | Eisenhauer | July 26, 1949 |
| 2,559,425 | Haracz | July 3, 1951 |